US009648042B2

(12) United States Patent
Cho

(10) Patent No.: US 9,648,042 B2
(45) Date of Patent: May 9, 2017

(54) APPARATUS AND METHOD FOR MANAGING SECURITY CONTENT USING VIRTUAL FOLDER

(71) Applicant: FASOO.COM CO., LTD, Seoul (KR)

(72) Inventor: Jung-Hyun Cho, Seoul (KR)

(73) Assignee: FASOO.COM CO., LTD, Mapo-gu, Seoul (KR)

( * ) Notice: Subject to any disclaimer, the term of this patent is extended or adjusted under 35 U.S.C. 154(b) by 0 days.

(21) Appl. No.: 14/439,077

(22) PCT Filed: Apr. 24, 2013

(86) PCT No.: PCT/KR2013/003525
§ 371 (c)(1),
(2) Date: Apr. 28, 2015

(87) PCT Pub. No.: WO2014/077474
PCT Pub. Date: May 22, 2014

(65) Prior Publication Data
US 2015/0281284 A1    Oct. 1, 2015

(30) Foreign Application Priority Data

Nov. 13, 2012 (KR) .................. 10-2012-0127793

(51) Int. Cl.
*H04L 29/06* (2006.01)
*H04L 29/08* (2006.01)
*G06F 21/62* (2013.01)

(52) U.S. Cl.
CPC .......... *H04L 63/20* (2013.01); *G06F 21/6281* (2013.01); *H04L 63/10* (2013.01); *H04L 67/10* (2013.01)

(58) Field of Classification Search
CPC .......... H04L 63/20; H04L 63/10; H04L 67/10
(Continued)

(56) References Cited

U.S. PATENT DOCUMENTS

2006/0294391 A1* 12/2006 Wu .................. G06F 21/6209
713/182
2007/0156659 A1* 7/2007 Lim .................. G06F 21/6227
(Continued)

FOREIGN PATENT DOCUMENTS

KR    1020110016227 A    2/2011
KR    1020110100839 A    9/2011

*Primary Examiner* — Matthew Henning
(74) *Attorney, Agent, or Firm* — William Park & Associates Ltd.

(57) ABSTRACT

Provided are an apparatus and method for managing security contents using a virtual folder. The apparatus for managing security contents includes a data control unit that receives an authority policy on contents from a security content server, and stores the received authority policy in a storage means, a security processing unit that encodes or decodes the contents based on the authority policy provided from the data control unit, and a security filesystem interface unit that creates a virtual folder based on position information of a folder to be virtualized and path information of the virtual folder by driving a virtual folder creation module that is operated in a kernel mode and registers the created virtual folder in a filesystem, and provides, to the security processing unit, contents corresponding to an input and output event for contents which have been recorded or are to be recorded in the virtual folder hooked from the kernel mode and instructs the security processing unit to encode or decode the provided contents. According to the present invention, it is possible to provide contents created in different environments to a user based on authority information without any separate content conversion operation.

20 Claims, 6 Drawing Sheets

(58) Field of Classification Search
USPC .............................................................. 726/1
See application file for complete search history.

(56) References Cited

U.S. PATENT DOCUMENTS

| | | | |
|---|---|---|---|
| 2008/0155652 A1* | 6/2008 | DeBie | G06F 21/604 726/2 |
| 2013/0283232 A1* | 10/2013 | Van Megchelen | G06F 17/30235 717/106 |
| 2013/0318347 A1* | 11/2013 | Moffat | H04L 63/08 713/168 |

* cited by examiner

APPARATUS AND METHOD FOR MANAGING SECURITY CONTENT USING VIRTUAL FOLDER

CROSS-REFERENCE TO RELATED APPLICATION

This application claims priority to and the benefit of Korean Patent Application No. 2012-0127793, filed on Nov. 13, 2012, the disclosure of which is incorporated herein by reference in its entirety.

BACKGROUND

1. Field of the Invention

The present invention relates to an apparatus and method for managing security contents using a virtual folder, and more particularly, to an apparatus and method for managing security contents using a virtual folder, which may enable contents created in different environments to be controlled according to authority set in the contents or a user without separate operations in the different environments.

2. Discussion of Related Art

As cloud computing technology is widely used with the dissemination of smart phones and development of wireless communication technology, a computing environment to create and browse contents such as documents, pictures, videos, and the like is becoming diverse. However, due to the difference between a content creation environment and a content browsing environment, a case may occur in which the cloud computing technology is not properly utilized. In order to properly take advantage of the cloud computing technology, it is necessary to support creation and browsing of the contents in the same environment without any content conversion. In particular, in order to browse contents in different operating system (OS) environments, it is necessary to create and browse the contents through a common environment. In order to support this, it is necessary to establish a virtual environment suitable for each OS environment so that control related to creation, browsing, authority, and the like of the contents may be possible. For example, techniques that enable encoded contents created in a Microsoft's Windows (MS Windows) environment to be controlled according to authority of the contents without a separate operation in a Mac OS environment different from the MS Windows environment are required.

However, as to techniques which have been proposed so far, only technique that creates a separate virtual database that is accessible by a plurality of user terminals to thereby manage contents, or creates a virtual folder in each user terminal using virtualization technology to thereby manage contents has been proposed, but there is no technique that can accommodate the above-mentioned requirements. In particular, the technique that creates the separate virtual database accessible by the plurality of user terminals to thereby manage contents may vary whether contents are provided to each user and the usage policy of the provided contents through management of the authority policy on the contents, but may not provide a scheme that can browse the contents without any conversion of the contents in different OSs.

PRIOR ART DOCUMENTS

Patent Documents (Patent Document 1) Korea Patent Laid-Open No. 10-2011-0124339 (Intel Corp. Nov. 16, 2011)

(Patent Document 2) Korea Patent Laid-Open No. 10-2012-0093296 (Delphix Corp. Aug. 22, 2012)

SUMMARY OF THE INVENTION

The present invention is directed to an apparatus and method for managing contents using a virtual folder, which may provide contents created in different environments to users based on authority information without any separate content conversion operation.

The present invention is also directed to a computer-readable recording medium that records a program for executing, in a computer, a method for managing contents using a virtual folder, which may provide contents created in different environments to users based on authority information without any separate content conversion operation.

According to an aspect of the present invention, there is provided an apparatus for managing security contents including: a data control unit that receives an authority policy on contents from a security content server, and stores the received authority policy in a storage means; a security processing unit that encodes or decodes the contents based on the authority policy provided from the data control unit; and a security filesystem interface unit that creates a virtual folder based on position information of a folder to be virtualized and path information of the virtual folder by driving a virtual folder creation module that is operated in a kernel mode and registers the created virtual folder in a filesystem, and provides, to the security processing unit, contents corresponding to an input and output event for contents which have been recorded or are to be recorded in the virtual folder hooked from the kernel mode and instructs the security processing unit to encode or decode the provided contents.

According to another aspect of the present invention, there is provided an apparatus for managing security contents including: a storage means that stores an authority policy on contents received from a security content server and a security content management program for managing security contents; and a processor that performs security management on the contents by executing the security content management program, wherein the security content management program includes a data control module that stores the authority policy received from the security content server in the storage means, a security processing module that encodes or decodes the contents based on the authority policy provided from the data control module, and a security filesystem interface module that creates a virtual folder based on position information of a folder to be virtualized and path information of the virtual folder by driving a virtual folder creation module that is operated in a kernel mode and registers the created virtual folder in a filesystem, and provides, to the security processing module, contents corresponding to an input and output event for contents which have been recorded or are to be recorded in the virtual folder hooked from the kernel mode and instructs the security processing module to encode or decode the provided contents.

According to still another aspect of the present invention, there is provided a method for managing security contents including: (a) receiving an authority policy on contents from a security content server, and storing the received authority policy in a storage means; (b) creating a virtual folder based on position information of a folder to be virtualized and path information of the virtual folder by driving a virtual folder creation module that is operated in a kernel mode, and registering the created virtual folder in a filesystem; and (c)

hooking an input and output event for contents which have been recorded or are to be recorded in the virtual folder from the kernel mode, providing contents corresponding to the hooked input and output event to a security processing unit, and instructing the security processing unit to encode or decode the provided contents.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
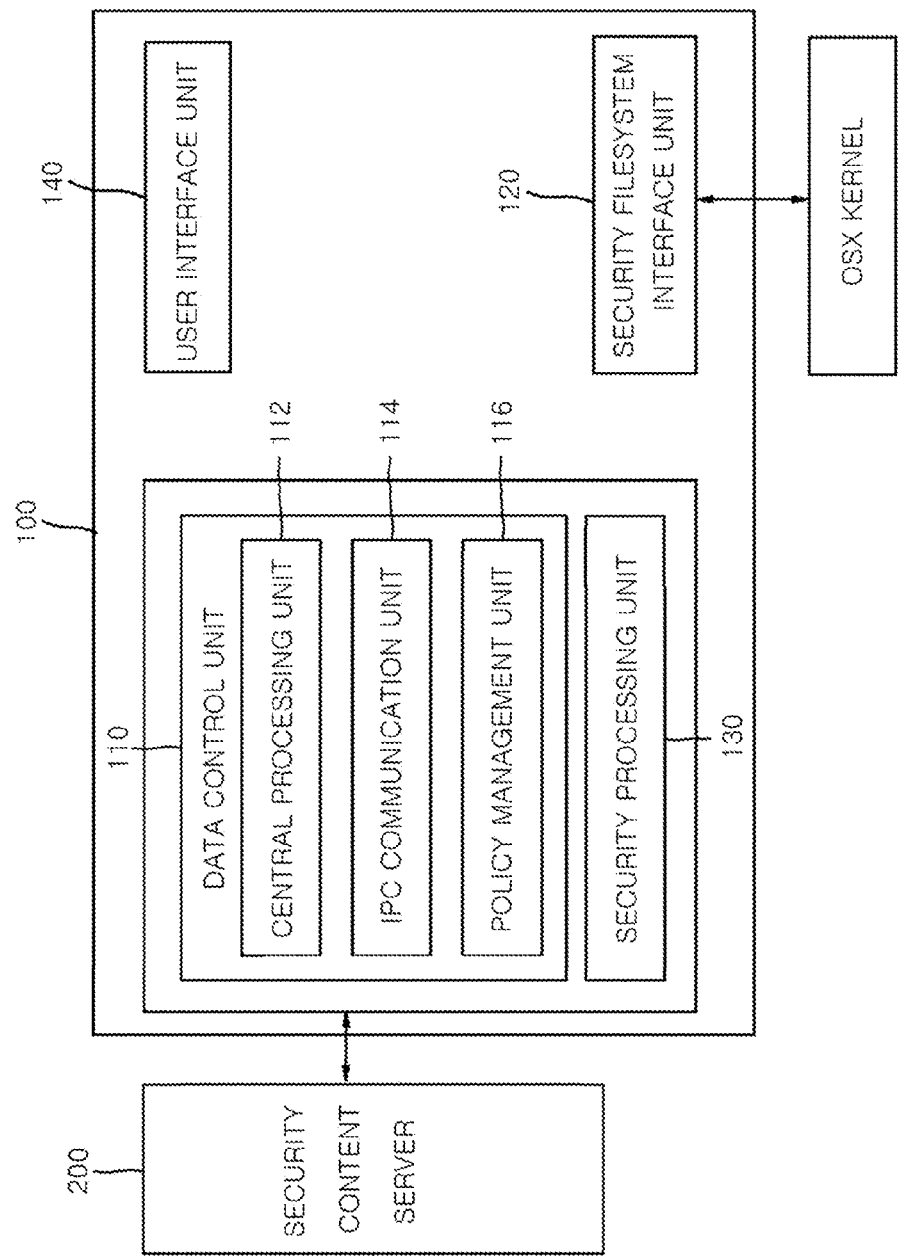
FIG. 1 is a diagram illustrating a configuration of an apparatus for managing security contents using a virtual folder according to an embodiment of the present invention.

Hereinafter, an apparatus and a method for managing security contents using a virtual folder according to embodiments of the present invention will be described in detail below with reference to the accompanying drawings. FIG. 1 is a diagram illustrating a configuration of an apparatus for managing security contents using a virtual folder according to an embodiment of the present invention. In the following description, contents refer to electronic type files that can be browsed, corrected, or stored in an information processing apparatus such as a computer or a smart phone, such as documents, pictures, videos, and the like. For convenience of description, contents may refer to a specific document, file, and the like. In addition, the apparatus for managing security contents using a virtual folder according to an embodiment of the present invention may be a server, a desktop computer, a laptop, a PAD, a smart phone, or the like.

Referring to FIG. 1, the apparatus 100 for managing security contents using the virtual folder according to an embodiment of the present invention includes a data control unit 110, a security filesystem interface unit 120, a security processing unit 130, and a user interface unit 140.

The data control unit 110 performs Inter-Processing Communication (IPC) communication between individual execution files, transmission and reception of security policy and information with a security content server 200, content usage policy management, and the like. For this, the data control unit 110 includes a central processing unit 112, an IPC communication unit 114, and a policy management unit 116. The central processing unit 112 transmits and receives data to and from the security content server 200 by supporting a variety of data transmission and reception protocols such as REST, JSON, or WebSocket, while maintaining a session so that the function of each execution file can be performed. In addition, the central processing unit 112 provides policy information in response to a policy providing request for content security from the security processing unit 130. The policy information includes authority policy information and security policy information, and these policies are set by a user or received from the security content server 200. In addition, the central processing unit 112 processes communication, authority information, and the like between execution processes such as a process having a user interface for authority control, a system tray process, an integrated viewer process, etc. The IPC communication unit 114 manages IPC communication between executed individual execution files. The policy management unit 116 stores the policy information received from the security content server 200, policy information set directly by a user with respect to individual contents or a security folder, and the like in a separate storage means (not shown. In addition, the policy management unit 116 transmits the stored policy information to the security content server 200, as necessary, or provides the policy information to the security processing unit 130 in response to the policy providing request from the security processing unit 130.

The security filesystem interface unit 120 is in charge of input and output of files for security contents, monitors creation, change, browsing, and the like of contents, calls an integrated viewer in order to perform creation, change, browsing, and the like of contents by an authenticated user, and requests encoding or decoding of contents from the security processing unit 130. Such a security filesystem interface unit 120 performs creation of the virtual folder and the above-mentioned function by combining kernel extension file input and output hooking technique and FileSystem in USerspace (FUSE) technique.

Figure 2:
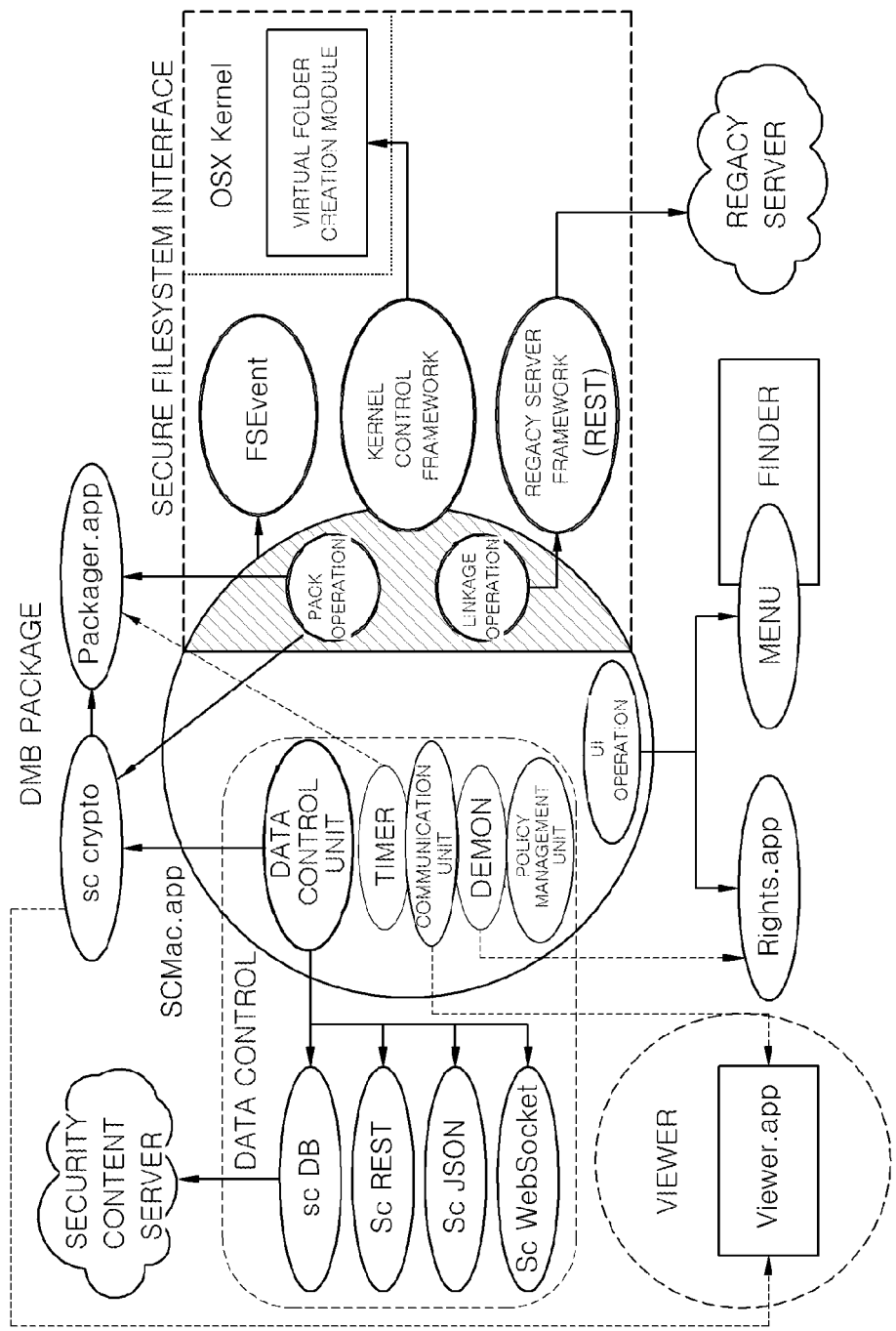
FIGS. 2 and 3 are diagrams respectively illustrating a configuration and a stack structure of an overall system including an apparatus 100 for managing security contents using a virtual folder according to an embodiment of the present invention that is implemented in the Mac operating system (OS)
Figure 3:
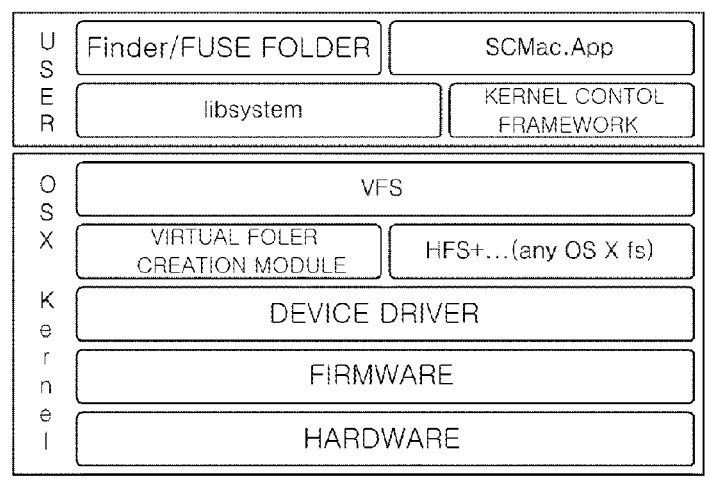

FIGS. 2 and 3 are diagrams respectively illustrating a configuration and a stack structure of an overall system including an apparatus 100 for managing security contents using a virtual folder according to an embodiment of the present invention that is implemented in the Mac operating system (OS). Referring to FIGS. 2 and 3, the apparatus 100 for managing security contents using the virtual folder according to an embodiment of the present invention is implemented in the form of an information processing apparatus including a communication function, such as a computer, a laptop, a PDA, a smart phone, etc. which are equipped with an application (SCMac.App) for security content management.

Referring to FIGS. 2 and 3, when the apparatus for managing security contents using the virtual folder according to an embodiment of the present invention that is operated in a user mode is driven, the security filesystem interface unit 120 confirms a path in which the virtual folder is to be mounted, and then scans folder information of the path. Next, the security filesystem interface unit 120 performs creation and management of the virtual folder by a virtual folder creation module that is operated in a kernel mode through a kernel control framework operated in the user mode. In this instance, the security filesystem interface unit 120 creates the virtual folder using scanning information of the folder through a function included in the virtual folder creation module, and mounts the created virtual folder in a filesystem.

Next, when the virtual folder is completely mounted in the filesystem, the security filesystem interface unit 120 determines a processing position (i.e., user mode and kernel mode) of the corresponding file by pulling up, to the user mode, input and output of a file incoming to the virtual folder, and then establishes a communication channel with the kernel mode in order to notify the kernel mode of the determined result. By this process, whether an event such as creation, reading, writing, movement, copy, or the like of the file that enters the kernel mode is an operation required to be processed in the user mode may be determined and processed. An encoded file may be decoded so as to browse the corresponding file through authority management, and a general file created in an encoded folder may be encoded. By this configuration, the present invention has an advantage that may reduce system collision which occurs due to memory management and register processing using assembly when processing the corresponding file using an existing kernel mode, thereby reliably processing the corresponding file.

Meanwhile, the operation of the security filesystem interface unit 120 may be largely divided into a file input and output management operation, a packing operation, and a linkage operation. The file input and output management operation is an operation of determining a processing position of the corresponding file by detecting an event for the file through interfacing with the kernel mode. The packing operation is an operation of providing the corresponding file to the security processing unit 130 to request encoding and decoding when it is determined that the file determined to be processed in the user mode is required to be encoded or decoded. The linkage operation is an operation that is performed in conjunction with a legacy server through a legacy server framework.

The security processing unit 130 encodes a file created in a specific folder (e.g., virtual folder, security folder, or the like) into the format of a new security file or decodes the security file. Such an operation of the security processing unit 130 is requested by the security filesystem interface unit 120, and the security filesystem determines whether to encode the corresponding file into the security file. In addition, when encoding or decoding the corresponding file, the security processing unit 130 acquires policy information for file security from the data control unit 110, thereby encoding or decoding the corresponding file.

The user interface unit 140 provides a means of receiving processing commands (creation, browsing, copy, correction, etc.) for the corresponding file from a user or outputting the processing results to the user. The user interface unit 140 performs processing of a pop-up window according to clicking of a right button of a mouse, driving of a viewer for supporting an OLE format in order to output DRM contents to the user, and the like.

The apparatus 100 for managing security contents using the virtual folder according to an embodiment of the present invention that has been described with reference to FIGS. 1 to 3 may be implemented in the form of an information processing apparatus including a communication function, such as a computer, a laptop, a PDA, a smart phone, etc. which are equipped with an application. In this instance, individual hardware modules may be implemented as corresponding software modules. The information processing apparatus includes a network interface device, an input and output device, a display device, a processor, a non-volatile storage device, a system memory, and the like. The application for performing security content management using the virtual folder according to the present invention is installed on the system memory, and is driven by a driving command of a user or at the time of booting of the information processing apparatus.

Figure 4:
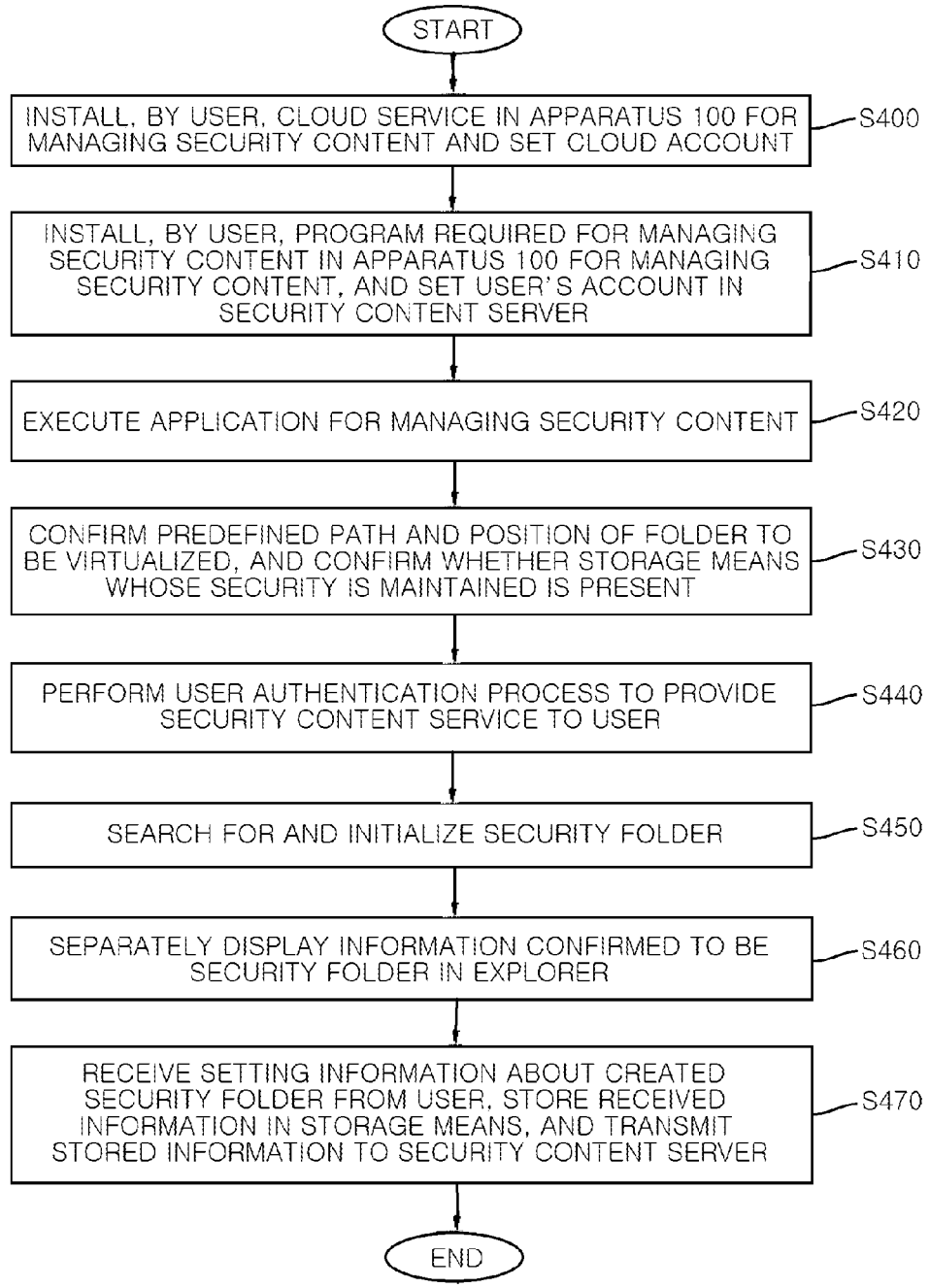
FIG. 4 is a flowchart illustrating a method for managing security contents performed in an apparatus 100 for managing security contents using a virtual folder according to an embodiment of the present invention.

FIG. 4 is a flowchart illustrating a method for managing security contents performed in an apparatus 100 for managing security contents using a virtual folder according to an embodiment of the present invention.

Referring to FIG. 4, prior to performing the method for managing security contents using the virtual folder according to an embodiment of the present invention, in operation 5400, a user installs a cloud service in the apparatus 100 for managing security contents, and sets a cloud account. Such an installation of the cloud service and setting of the account may be optional procedures, but may be essential procedures when the present invention is operated in conjunction with the cloud service (i.e., management of the file that is downloaded or uploaded through the cloud service). Next, in operation 5410, the user installs a program required for managing security contents, and sets an account of the user in the security content server 200. When such pre-procedures are completed, the user may use the security content management service.

First, in operation 5420, an application (e.g., scmac.app in a case of the Mac OS) for managing the security contents may be executed according to setting of a start program at the time of booting of the apparatus 100 for managing security contents, or may be executed by the user's driving command. Next, in operation S430, the apparatus 100 for managing security contents determines a path defined in advance and a position of a folder to be virtualized, and determines whether a storage means (e.g., a file database) whose security is maintained (i.e., the locking of the file database using the user's login information is performed) is present. This is a process of determining presence and absence of a physical storage means whose security is maintained, and in this instance, a security folder (i.e., a virtual folder that is created using FUSE by the virtual folder creation module) is not created.

Next, in operation 5440, the apparatus 100 for managing security contents performs a user authentication process in order to provide a security content service to the user. In this instance, the apparatus 100 for managing security contents stores user information in the storage means based on the login information received from the user through a user authentication screen, and receives a DRM policy (a user policy or a security folder policy when an existing security folder is present) from the security content server 200. When the security content service according to the present invention is performed in conjunction with the cloud service, a user authentication process for the cloud service by a cloud authentication token is performed together in this process. Next, the apparatus 100 for managing security contents stores, in the storage means, the DRM policy received from the security content server 200, or updates the DRM policy previously stored in the storage means into a DRM policy newly received from the security content server 200.

Next, in operation 5450, the apparatus 100 for managing security contents searches for the security folder and initializes the searched security folder. This is a process of determining whether the security folder has been already present. The apparatus 100 for managing security contents confirms the DRM policy corresponding to the user in the storage means, and confirms a specific setting file (i.e., a setting file including information for identifying the security folder) in the folder to be virtualized, thereby determining whether information stored in the corresponding setting file is the same as the information stored in the storage means.

Next, in operation 5460, the apparatus 100 for managing security contents separately displays the information that has been determined to be the security folder, in an explorer (e.g., Mac OS Finder). In this instance, the apparatus 100 for managing security contents creates, using the FUSE, the folder to be virtualized as the security folder provided in the form of the virtual folder to thereby mount the created folder in the filesystem, and displays folder information mounted as the security folder in the favorites of the explorer. Next, the apparatus 100 for managing security contents transmits, in the user mode, the input and output of the corresponding file transmitted through a kernel file system using the function of the kernel control framework, thereby monitoring whether to control the corresponding contents.

Next, in operation S470, the apparatus 100 for managing security contents receives setting information for the created security folder from the user, stores the received information in the storage means, and transmits the stored information to the security content server 200. For this, the apparatus 100 for managing security contents outputs a security folder setting screen to the user, and stores an authority set by the user in the storage means. Next, the apparatus 100 for managing security contents transmits information of the security folder to the security content server 200.

When the security folder (i.e., the virtual folder) is created through the above-described procedures, the user may perform management operations such as storing contents in the security folder, browsing the contents stored in the security folder, changing setting information about the security folder, confirming information of the file stored in the security folder, inquiring a usage history about the file stored in the security folder, and the like. For such management operations with respect to the security folder, the apparatus 100 for managing security contents may output a menu window including menus associated with the individual management operations, and the output of the menu window may be implemented to be performed in conjunction with clicking of the right button of the mouse.

Figure 5:
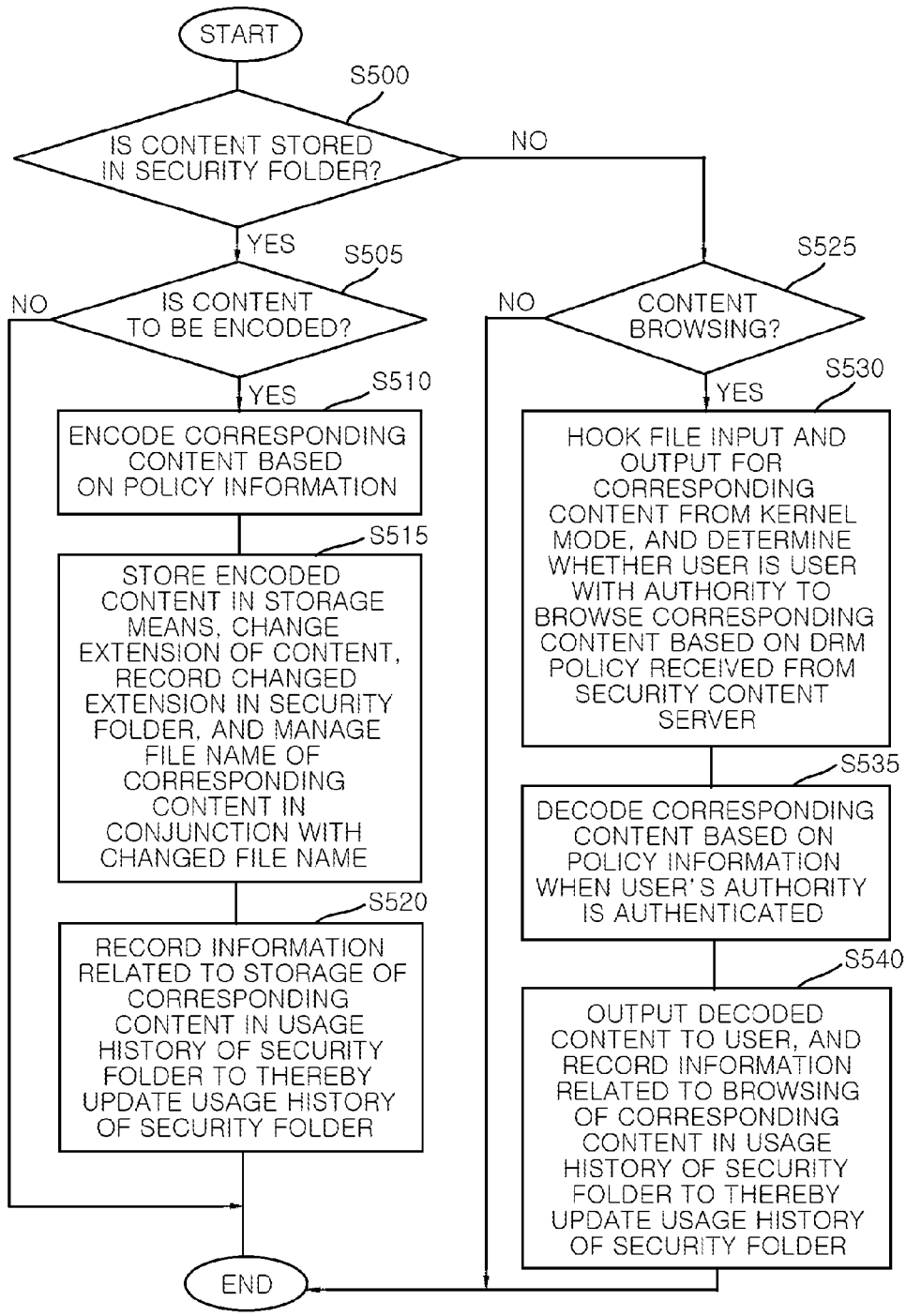
FIG. 5 is a flowchart illustrating a process of storing contents in a security folder or browsing the contents stored in the security folder.

FIG. 5 is a flowchart illustrating a process of storing contents in a security folder or browsing the contents stored in the security folder.

Referring to FIG. 5, when a user selects storage of the contents in the security folder displayed on the explorer in operation S500, the security filesystem interface unit 120 of the apparatus 100 for managing security contents hooks the input and output of the file for the corresponding contents from the kernel mode, and confirms whether the corresponding contents are to be encoded in operation S505. In this instance, whether the corresponding contents are to be encoded is confirmed based on the policy information provided from the data control unit 110. When it is confirmed that the corresponding contents are to be encoded, the security filesystem interface unit 120 transmits the corresponding contents to the security processing unit 130, and the security processing unit 130 encodes the corresponding contents based on the policy information provided from the data control unit 110 and returns the encoded contents to the security filesystem interface unit 120 in operation S510. Next, the encoded contents are stored in a physical position of the storage means, and the security filesystem interface unit 120 changes an extension of the corresponding contents (e.g., the changed file name is userfile.scd when a file name of the corresponding contents is userfile.doc), records the changed extension in the security folder, and manages a file name of the corresponding contents in conjunction with the changed file name in operation S515. In this instance, in operation S520, the security filesystem interface unit 120 records information related to the storage of the corresponding contents in the usage history of the security folder, thereby updating the usage history of the security folder.

Unlike this, when the user selects browsing of the contents stored in the security folder displayed on the explorer in operation S525, the security filesystem interface unit 120 of the apparatus 100 for managing security contents hooks the input and output of the file for the corresponding contents from the kernel mode, and confirms whether the user is a user with authority to browse the corresponding contents based on the DRM policy received from the security content server 200 in operation S530. In this instance, whether the user is the user with authority to browse the corresponding contents is confirmed based on the policy information provided from the data control unit 110. When the authority of the user is authenticated, the security filesystem interface unit 120 transmits the corresponding contents to the security processing unit 130, and the security processing unit 130 decodes the corresponding contents based on the policy information provided from the data control unit 110 and returns the decoded contents to the security filesystem interface unit 120 in operation S535. The decoded contents are output to the user, and the security filesystem interface unit 120 records information related to the browsing of the corresponding contents in the usage history of the security folder, thereby updating the usage history of the security folder in operation S540.

Meanwhile, other than the storage and browsing of the contents in the security folder which have been described with reference to FIG. 5, other operations such as correction, deletion, etc., of the contents may be performed, and in this instance, whether authorities for individual operations (i.e., whether correction of the corresponding contents is allowable or whether an authority to correct the corresponding contents is present) are authenticated may be determined based on the policy information stored in the data control unit 110. The usage history of the security folder may be transmitted to the security content server 200 whenever it is updated, or at a predetermined period.

Figure 6:
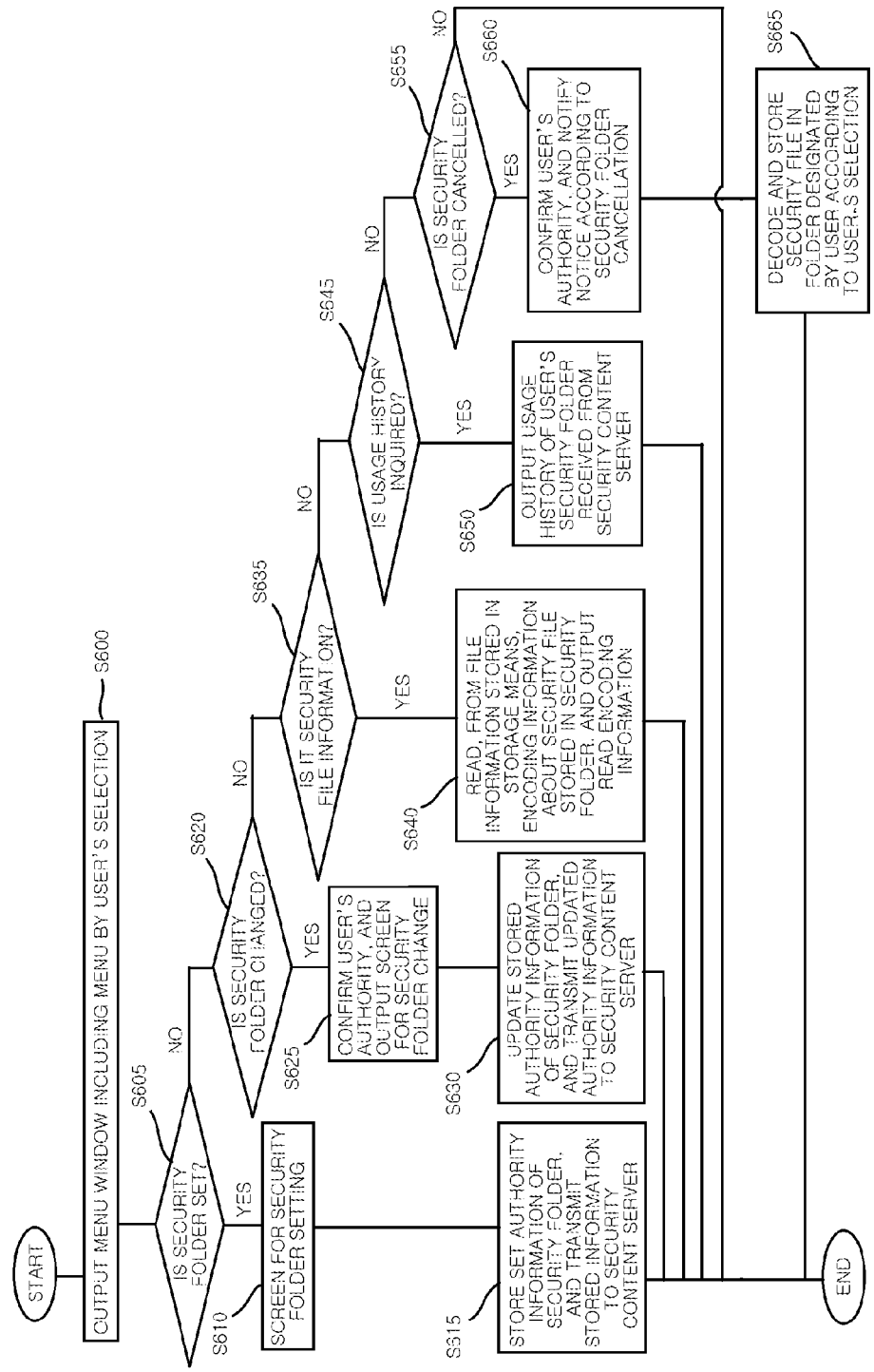
FIG. 6 is a flowchart illustrating a process of managing a security folder according to a menu input by a user through a menu window.

FIG. 6 is a flowchart illustrating a process of managing a security folder according to a menu input by a user through a menu window.

Referring to FIG. 6, when a user selects the security folder displayed on the explorer and then clicks on a right button of a mouse, the user interface unit 140 of the apparatus 100 for managing security contents outputs a menu window including menus in operation S600. In this instance, the right button of the mouse has been illustrated as a means for receiving an output command of the menu window from the user, but this is merely an example. That is, other types of input means may be employed. When the user selects a "security folder setting" menu in operation S605, the data control unit 110 controls the user interface unit 140 to output a screen for security folder setting in operation S610. Next, the data control unit 110 stores, in the storage means, authority information for the security folder set by the user as user policy information, and transmits the stored authority information to the security content server 200 in operation S615.

Next, when the user selects a "security folder change" menu in operation S620, the data control unit 110 confirms a user's authority, and then controls the user interface unit 140 to output a screen for security folder change in operation S625. Next, the data control unit 110 updates the authority information for the security folder stored in the storage means into newly set authority information, and transmits the updated authority information to the security content server 200 in operation S630.

Next, when the user selects a "security file information" menu in operation S635, the data control unit 110 reads encoding information about the security file stored in the security folder from file information stored in the storage means, and outputs the read information to the user through the user interface unit 140 in operation S640.

Next, when the user selects a "usage history inquiry" menu in operation S645, the data control unit 110 requests, from the security content server 200, providing of the usage history (i.e., information about creation of the security folder, information about file storage in the security folder, information about browsing of the file stored in the security folder, etc.) of the security folder of the corresponding user, and outputs the usage history received from the security content server 200, to the user through the user interface unit 140 in operation S650.

Next, when the user selects a "security folder cancellation" menu in operation S655, the data control unit 110 confirms a user's authority, and then notifies notices in accordance with the security folder cancellation through the user interface unit 140 in operation S660.

Next, the data control unit 110 inquires whether the security file recorded in the security folder is decoded according to the security folder cancellation, and decodes and stores the security file in a folder designated by the user according to the user's selection in operation S665. In this instance, decoding of the security file is performed by the security processing unit 130. Next, the data control unit 110 selectively transmits information about cancellation of the corresponding security folder to the security content server 200.

As described above, according to the apparatus and method for managing security contents using the virtual folder according to the embodiments of the present invention, it is possible to provide contents created in different environments to a user based on the authority information without any separate content conversion operation. In addition, it is possible to reduce system collision which occurs due to memory management and register processing using assembly when processing the corresponding file using an existing kernel mode, thereby reliably processing the corresponding file.

The method for managing security contents using the virtual folder according to the embodiments of the present invention may be implemented as a computer-readable code in a computer-readable recording medium. The computer-readable recording medium may include all kinds of recording devices in which data that can be read by a computer system is stored. Examples of the computer-readable recording medium include a ROM, a RAM, a CD-ROM, a magnetic tape, a floppy disk, an optical data storage device, and the like, and also include a carrier wave (e.g., transmission through the Internet). In addition, the computer-readable recording medium is distributed in a computer system connected via a network so that the computer-readable codes are stored and executed in a distributed manner.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for managing security contents comprising:
    a data control unit configured to receive an authority policy on contents from a security content server, and store the received authority policy in a storage means, the data control unit including a central processing unit, and the central processing unit maintaining a session so that the function of each execution file is performed, transmitting and receiving data to and from the security content server by supporting data transmission and reception protocols, and processing communication and authority information between execution processes in which a process having a user interface for authority control, a system tray process and an integrated viewer process are included,
    wherein user information is stored in the storage means based on login information received through a user authentication screen before the data control unit receives the authority policy;
    a security processing unit configured to encode contents created on a first computing environment based on the authority policy provided from the data control unit, or decode contents that is required to be read, wrote, moved, copied or corrected on a second computing environment different from the first computing environment and stored in a virtual folder,
    wherein a file included in the contents to be encoded or decoded is confirmed for determining whether information stored in the file is the same as information stored in the storage means; and
    a security filesystem interface unit configured to create the virtual folder based on position information of a folder to be virtualized and path information of the virtual folder by driving a virtual folder creation module that is operated in a kernel mode and register the created virtual folder in a filesystem, and provide, to the security processing unit, contents corresponding to an input and output event hooked from the kernel mode for contents which have been recorded or are to be recorded in the virtual folder,
    wherein the virtual folder is controlled according to authority set in the contents or the process having a user interface for authority control, and
    wherein the file to be created in the virtual folder is encoded or decoded into a format of a new security file before the security processing unit encodes and decodes.

2. The apparatus for managing security contents of claim 1, wherein the contents are contents to be received from or transmitted to a file sharing server that provides file sharing services.

3. The apparatus for managing security contents of claim 1, wherein the security filesystem interface unit provides, when an event for recording of the contents recorded in the virtual folder on the first computing environment is hooked from the kernel mode, contents corresponding to the hooked event to the security processing unit, and instructs the security processing unit to encode the provided contents, the security processing unit encodes the contents corresponding to the hooked event based on the authority policy acquired from the data control unit, and provides the encoded contents to the security filesystem interface unit, and the security filesystem interface unit changes an extension of the contents corresponding to the hooked event to an extension indicating that the corresponding contents have been encoded, and then records the changed extension in the virtual folder.

4. The apparatus for managing security contents of claim 1, wherein the security filesystem interface unit provides, when an event for reading of the contents recorded in the virtual folder is hooked from the kernel mode on the second computing environment, contents corresponding to the hooked event to the security processing unit and instructs the security processing unit to decode the provided contents, and the security processing unit decodes the contents corresponding to the hooked event based on the authority policy acquired from the data control unit, and provides the decoded contents to the security filesystem interface unit.

5. The apparatus for managing security contents of claim 4, wherein the data control unit confirms authority of a user who requests reading of the contents corresponding to the hooked event based on the authority policy stored in the storage means, and the security filesystem interface unit provides, when the authority of the user is authenticated from the data control unit, the contents corresponding to the hooked event to the security processing unit, and instructs the security processing unit to decode the provided contents.

6. The apparatus for managing security contents of claim 1, wherein the security filesystem interface unit creates a usage history including at least one of browsing, copy, and correction for each of the contents recorded in the virtual folder, and the data control unit transmits the usage history to the security content server by a user's command or at a predetermined period.

7. The apparatus for managing security contents of claim 6, wherein the security filesystem interface unit acquires, when providing of the usage history of the contents recorded in the virtual folder is requested from the user, the usage history from the security content server and outputs the acquired usage history to the user.

8. The apparatus for managing security contents of claim 1, wherein the data control unit includes a central processing unit that receives the authority policy from the security content server, and transmits, to the security content server, a usage history including at least one of browsing, copy, and correction for each of the contents recorded in the virtual folder created by the security filesystem interface unit, an IPC communication unit that manages communication between processes executed by the data control unit, the security processing unit, and the security filesystem interface unit, and a policy management unit that stores and manages, in the storage means, the authority policy received from the security content server and policy information that has been set directly by a user with respect to each content or the virtual folder, reads the authority policy from the storage means in response to a request for providing of the authority policy from the security processing unit, and provides the read authority policy to the security processing unit.

9. An apparatus for managing security contents comprising:
a storage means that stores an authority policy on contents received from a security content server and a security content management program for managing security contents; and
a processor that performs security management on the contents by executing the security content management program,
wherein the security content management program includes a data control module that stores the authority policy received from the security content server in the storage means, and
wherein user information is stored in the storage means before the receiving the authority policy based on login information received through a user authentication screen;
a security processing module that encodes contents created on a first computing environment based on the authority policy provided from the data control module or decode contents that is required to be read, wrote, moved, copied or corrected on a second computing environment different from the first computing environment and stored in a virtual folder,
wherein a file included in the contents is confirmed for determining whether information stored in the file is the same as information stored in the storage means after the providing contents; and
a security filesystem interface module that creates the virtual folder based on position information of a folder to be virtualized and path information of the virtual folder by driving a virtual folder creation module that is operated in a kernel mode, registers the created virtual folder in a filesystem, and provides, to the security processing module, contents corresponding to an input and output event hooked from the kernel mode for contents which have been recorded or are to be recorded in the virtual folder,
wherein the virtual folder is controlled according to authority set in the contents or the process having a user interface for authority control, and
wherein the file to be created in the virtual folder is encoded or decoded into a format of a new security file.

10. The apparatus for managing security contents of claim 9, wherein the contents are contents to be received from or transmitted to a file sharing server that provides file sharing services.

11. The apparatus for managing security contents of claim 9, wherein the security filesystem interface module provides, when an event for recording of the contents recorded in the virtual folder on the first computing environment is hooked from the kernel mode, contents corresponding to the hooked event to the security processing module, and instructs the security processing module to encode the provided contents, the security processing module encodes the contents corresponding to the hooked event based on the authority policy acquired from the data control module, and provides the encoded contents to the security filesystem interface module, and the security filesystem interface module changes an extension of the contents corresponding to the hooked event to an extension indicating that the corresponding contents have been encoded, and then records the changed extension in the virtual folder.

12. The apparatus for managing security contents of claim 9, wherein the security filesystem interface module provides, when an event for reading of the contents recorded in the virtual folder is hooked from the kernel mode on the second computing environment, contents corresponding to the hooked event to the security processing module and instructs the security processing module to decode the provided contents, and the security processing module decodes the contents corresponding to the hooked event based on the authority policy acquired from the data control module, and provides the decoded contents to the security filesystem interface module.

13. The apparatus for managing security contents of claim 9, wherein the security filesystem interface module creates a usage history including at least one of browsing, copy, and correction for each of the contents recorded in the virtual folder, and the data control module transmits the usage history to the security content server by a user's command or at a predetermined period.

14. The apparatus for managing security contents of claim 13, wherein the security filesystem interface module acquires, when providing of the usage history of the contents recorded in the virtual folder is requested from the user, the usage history from the security content server and outputs the acquired usage history to the user.

15. A method for managing security contents comprising:
   (a) receiving an authority policy on contents from a security content server, and storing the received authority policy in a storage means,
   wherein user information is stored in the storage means before the receiving the authority policy based on login information received through a user authentication screen;
   (b) creating a virtual folder based on position information of a folder to be virtualized and path information of the virtual folder by driving a virtual folder creation module that is operated in a kernel mode, and registering the created virtual folder in a filesystem,
   wherein a file to be created in the virtual folder is encoded or decoded into a format of a new security file; and
   (c) hooking an input and output event for contents which have been recorded or are to be recorded in the virtual folder from the kernel mode on a first computing environment, providing contents corresponding to the hooked input and output event to a security processing unit, and instructing the security processing unit to encode the provided contents on a first computing environment or decode the provided contents on a second computing environment different from the first computing environment,
   wherein the file included in the contents is confirmed for determining whether information stored in the file is the same as information stored in the storage means after the providing contents.

16. The method for managing security contents of claim 15, wherein the contents are contents to be received from or transmitted to a file sharing server that provides file sharing services.

17. The method for managing security contents of claim 15, wherein the (c) hooking of the input and output event for contents includes encoding, when an event for recording of the contents recorded in the virtual folder is hooked from the kernel mode, contents corresponding to the hooked event based on the authority policy stored in the storage means, and changing an extension of the contents corresponding to the hooked event to an extension indicating that the corresponding contents have been encoded, and then recording the changed extension in the virtual folder.

18. The method for managing security contents of claim 15, wherein the (c) hooking of the input and output event for contents includes decoding, when an event for reading of the contents recorded in the virtual folder is hooked from the kernel mode, contents corresponding to the hooked event based on the authority policy stored in the storage means.

19. The method for managing security contents of claim 15, further comprising: (d) creating a usage history including at least one of browsing, copy, and correction for each of the contents recorded in the virtual folder; and (e) transmitting the usage history to the security content server by a user's command or at a predetermined period.

20. A computer-readable recording medium that records a program for executing, in a computer, the method for managing security contents described in claim 15.

* * * * *